(12) United States Patent
Yasuda et al.

(10) Patent No.: US 8,749,720 B2
(45) Date of Patent: Jun. 10, 2014

(54) EXPOSING DEVICE

(75) Inventors: Shin Yasuda, Kanagawa (JP); Keishi Shimizu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 632 days.

(21) Appl. No.: 12/880,540

(22) Filed: Sep. 13, 2010

(65) Prior Publication Data

US 2011/0181798 A1 Jul. 28, 2011

(30) Foreign Application Priority Data

Jan. 26, 2010 (JP) .................................. 2010-014526

(51) Int. Cl.
*G02F 1/13* (2006.01)
*G02F 1/135* (2006.01)

(52) U.S. Cl.
USPC ............................................... 349/2; 349/24

(58) Field of Classification Search
USPC .............. 349/24, 1–4, 69, 200; 347/134–137; 399/4
See application file for complete search history.

(56) References Cited

U.S. PATENT DOCUMENTS

| | | | | |
|---|---|---|---|---|
| 3,775,757 A | * | 11/1973 | Taylor et al. | 365/108 |
| 6,864,951 B1 | * | 3/2005 | Ren et al. | 349/200 |
| 2006/0262414 A1 | * | 11/2006 | Goto | 359/629 |
| 2007/0052915 A1 | * | 3/2007 | Galstian et al. | 349/200 |
| 2007/0268416 A1 | * | 11/2007 | Harada et al. | 349/2 |

FOREIGN PATENT DOCUMENTS

JP A-2002-350769 12/2002

OTHER PUBLICATIONS

Morisaki et al. "Effects of Polarization on light propagation in laser-induced lens in guest-host liquid crystal." J. Appl. Phys. 95 3279 (2004).*

* cited by examiner

*Primary Examiner* — Jessica M Merlin
(74) *Attorney, Agent, or Firm* — Oliff PLC

(57) ABSTRACT

An exposing device includes: a first light-emitting element that emits first light; a second light-emitting element that emits second light; and a liquid crystal panel that is disposed between the first and second light-emitting elements and a photoreceptor body to be exposed to the second light, and focuses the second light on the photoreceptor body by a convex refractive index distribution that is formed in the liquid crystal panel by an orientation variation that is caused by illumination with the first light.

3 Claims, 6 Drawing Sheets

EXPOSING DEVICE

CROSS-REFERENCE TO RELATED APPLICATIONS

This application is based on and claims priority under 35 USC 119 from Japanese Patent Application No. 2010-014526 filed on Jan. 26, 2010.

BACKGROUND

1. Technical Field

The present invention relates to an exposing device.

2. Related Art

Exposing devices are known which are configured in such a manner that a liquid crystal lens is disposed in an optical path and which perform optical correction on image light for illuminating a photoreceptor body.

SUMMARY

According to an aspect of the invention, there is provided an exposing device including: a first light-emitting element that emits first light; a second light-emitting element that emits second light; and a liquid crystal panel that is disposed between the first and second light-emitting elements and a photoreceptor body to be exposed to the second light, and focuses the second light on the photoreceptor body by a convex refractive index distribution that is formed in the liquid crystal panel by an orientation variation that is caused by illumination with the first light.

BRIEF DESCRIPTION OF THE DRAWINGS

Exemplary embodiments of the present invention will be described in detail based on the following figures, wherein.

DETAILED DESCRIPTION

Figure 1:
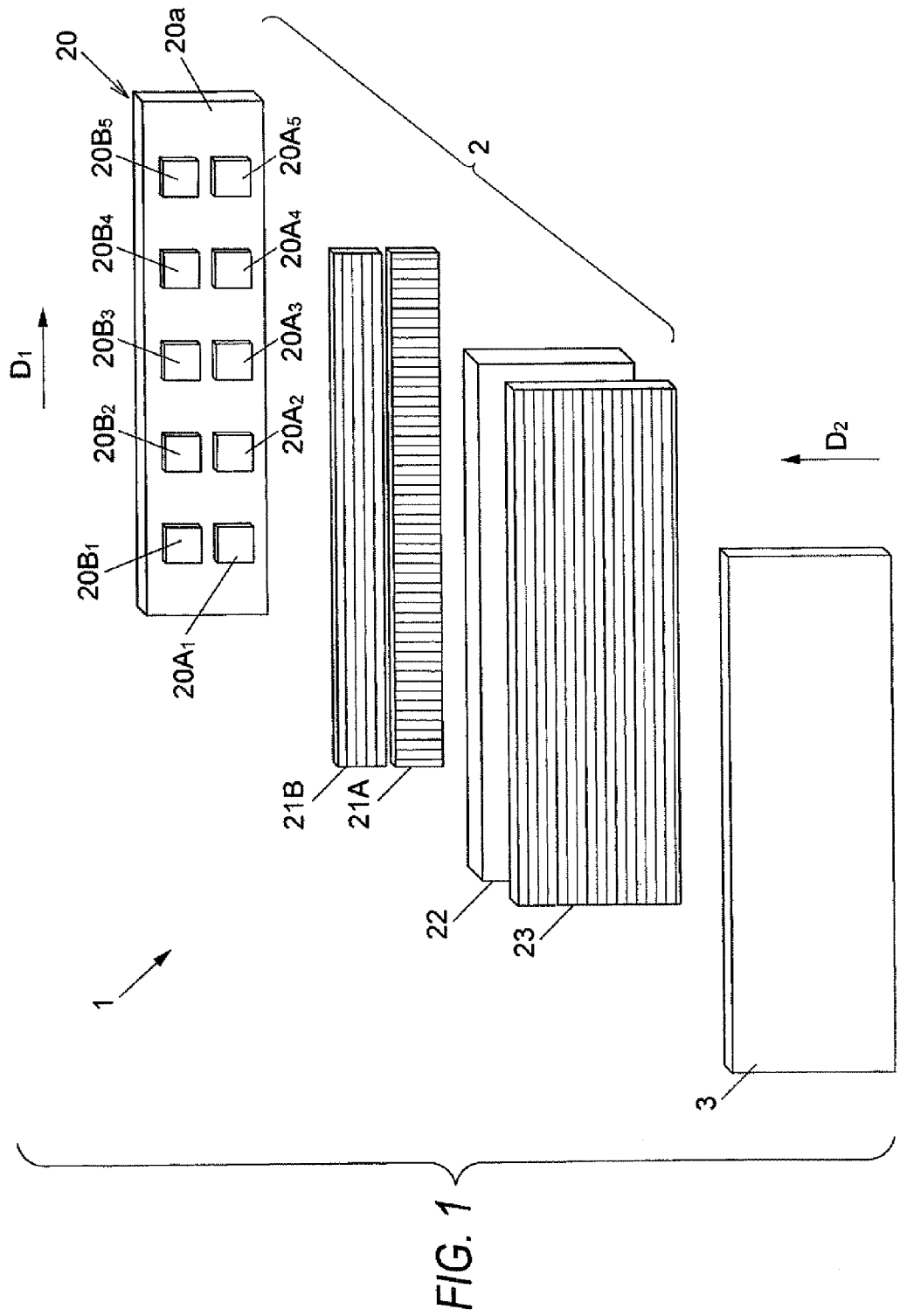
FIG. 1 is an exploded perspective view showing an example configuration of an exposing device according to an exemplary embodiment of the present invention.

FIG. 1 is an exploded perspective view showing an example configuration of an exposing device according to an exemplary embodiment of the present invention.

The exposing device 1 is part of an image forming apparatus such as a copier or a printer, and is driven by a light source driving section (described later). The exposing device 1 is equipped with an exposing unit 2 for illuminating a photoreceptor body 3 with exposing light. The exposing device 1 forms an electrostatic latent image on the photoreceptor body 3 moving in an auxiliary scanning direction $D_2$ by scanning it in a main scanning direction $D_1$ with exposing light emitted from the exposing unit 2. The electrostatic latent image formed on the photoreceptor body 3 is developed by an image forming unit of the image forming apparatus into a toner image, which is transferred to and fused on a recording sheet.

Although in FIG. 1 the photoreceptor body 3 is drawn as a flat body, instead a cylindrical photoreceptor drum may be used that is scanned in the auxiliary scanning direction $D_2$ by rotating it.

The exposing unit 2 is equipped with a light source 20 having first light-emitting elements $20A_1$-$20A_5$ (denoted generically by 20A) which are arranged at a prescribed pitch in the main scanning direction $D_1$ and second light-emitting elements $20B_1$-$20B_5$ (denoted generically by 20B) which are arranged at a prescribed pitch in the main scanning direction $D_1$, a first polarizing plate 21A and a second polarizing plate 21B whose polarization directions are perpendicular to each other, a liquid crystal panel 22 in which an orientation variation is caused when it is exposed to light, and a third polarizing plate 23 having the same polarization direction as the second polarizing plate 21B.

In the light source 20, the first light-emitting elements $20A_1$-$20A_5$ for illuminating the liquid crystal panel 22 with light to cause an orientation variation therein and the second light-emitting elements $20B_1$-$20B_5$ for illuminating the photoreceptor body 3 with light are formed on a substrate 20a.

The plural first light-emitting elements $20A_1$-$20A_5$, each having a light emission area of 20×20 $\mu m^2$, for example, are arranged in the main scanning direction $D_1$ at a pitch of about 20 $\mu m$. The first light-emitting elements $20A_1$-$20A_5$ are light-emitting diodes that emit light having such a wavelength as to cause an orientation variation in a liquid crystal material of the liquid crystal panel 22.

The plural second light-emitting elements $20B_1$-$20B_5$, each having a light emission area of 20×20 $\mu m^2$, for example, are arranged in the main scanning direction $D_1$ at a pitch of about 20 $\mu m$. The second light-emitting elements $20B_1$-$20B_5$ are light-emitting diodes that emit near-infrared light of 780 nm, for example.

The first light-emitting elements $20A_1$-$20A_5$ and the second light-emitting elements $20B_1$-$20B_5$ are arranged in pairs. However, they need not always be arranged in such a manner that the first light-emitting element and the second light-emitting element of each pair are arranged in the auxiliary scanning direction $D_2$ as in the case of FIG. 1; it suffices that the first light-emitting element and the second light-emitting element of each pair be located close to each other. Although in the example of FIG. 1 the five first light-emitting elements $20A_1$-$20A_5$ and the five second light-emitting elements $20B_1$-$20B_5$ are provided, the numbers of first light-emitting elements $20A_1$-$20A_5$ and second light-emitting elements $20B_1$-$20B_5$ are not limited to a certain number and may be either one or a plural number.

The liquid crystal panel 22 uses a light-responsive material, such as azobenzene or bacteriorhodopsin, that causes a liquid crystal orientation variation when illuminated with light having a prescribed wavelength.

Figure 2:
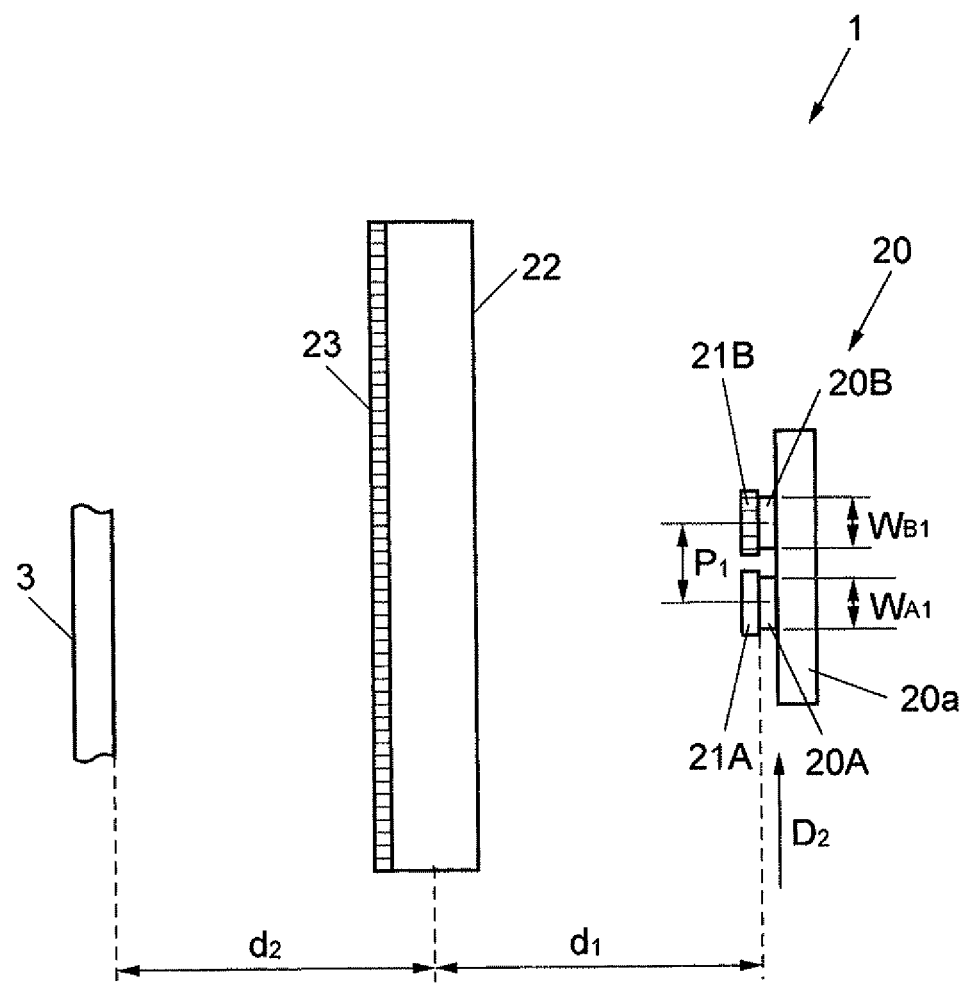
FIG. 2 is a side view of the exposing device as viewed from a main scanning direction.

FIG. 2 is a side view of the exposing device 1 as viewed from the main scanning direction $D_1$.

The first polarizing plate 21A and the second polarizing plate 21B are disposed so as to be in contact with the first light-emitting elements $20A_1$-$20A_5$ and the second light-emitting elements $20B_1$-$20B_5$, respectively. The third polarizing plate 23 is disposed so as to be in contact with the liquid crystal panel 22. Although the first polarizing plate 21A and the second polarizing plate 21B may be disposed in the vicinities of the first light-emitting elements $20A_1$-$20A_5$ and the second light-emitting elements $20B_1$-$20B_5$, respectively, instead of being in contact with the latter and the third polarizing plate 23 may be disposed in the vicinity of the liquid crystal panel 22 instead of being in contact with the latter, the contact is desirable for miniaturization of the exposing device 1.

The light source 20 and the liquid crystal panel 22 have a distance $d_1$ and the liquid crystal panel 22 and the photoreceptor body 3 have a distance $d_2$. The distances $d_1$ and $d_2$ are set so that light beams that are emitted from the second light-emitting elements 20B are focused on the photoreceptor body 3 as a result of being subjected to optical correction by the liquid crystal 22.

In the light source 20, the first light-emitting elements 20A having a width $W_{A1}$ and the second light-emitting elements 20B having a width $W_{B1}$ are arranged at an interval $P_1$. As mentioned above, the widths $W_{A1}$ and $W_{B1}$ are 20 μm, for example. The interval $P_1$ is several tens of micrometers, for example.

Figure 3:
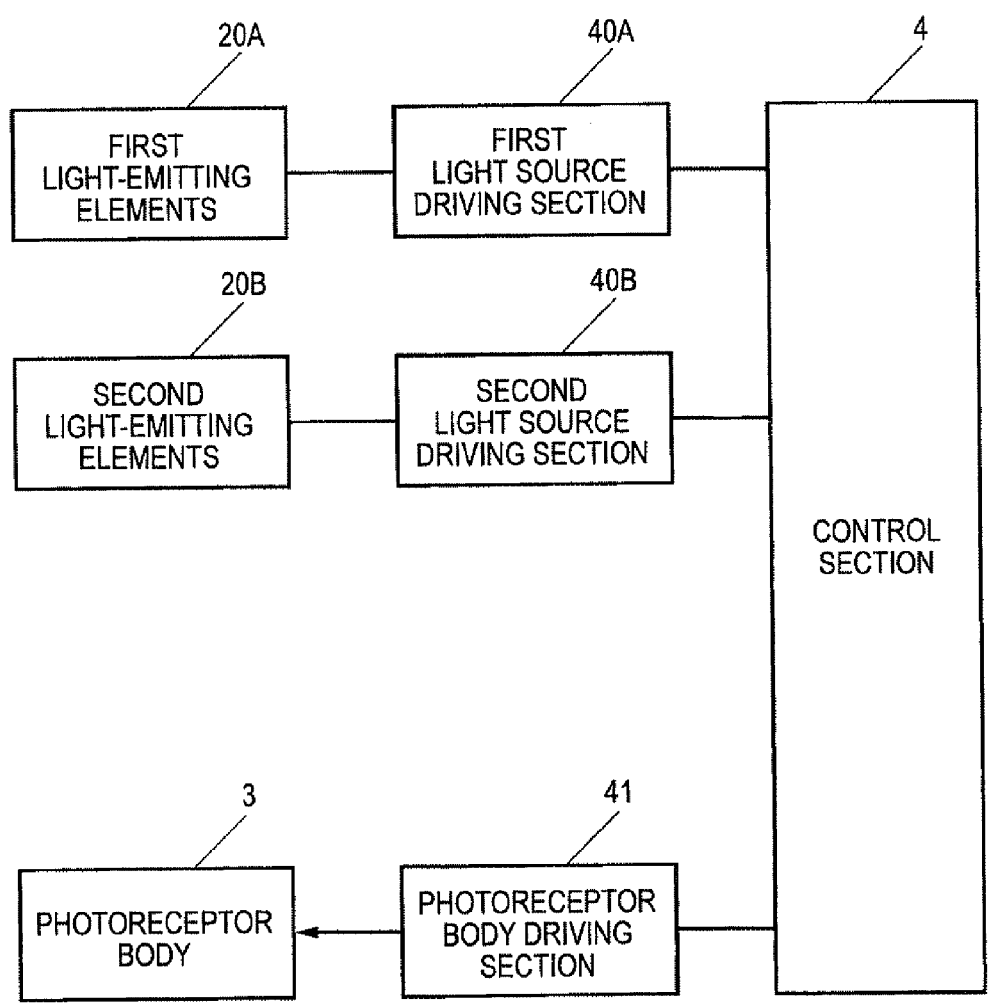
FIG. 3 is a block diagram showing an example configuration of a control system of a main part of an image forming apparatus incorporating the exposing device.

FIG. 3 is a block diagram showing an example configuration of a control system of a main part of an image forming apparatus incorporating the exposing device 1.

The image forming apparatus is equipped with a first light source driving section 40A and a second light source driving section 40B for applying drive voltages to the first light-emitting elements 20A and the second light-emitting elements 20B, respectively, to cause them to emit light, a photoreceptor body driving section 41 for moving the photoreceptor body 3 in the auxiliary scanning direction $D_2$, and a control section 4 such as a CPU (central processing unit) for controlling the operation timing of the first light source driving section 40A, the second light source driving section 40B, and the photoreceptor body driving section 41.

(Operation of Exemplary Embodiment)

Unit operations of the exposing device 1 according to the exemplary embodiment of the invention will be described below individually with reference to FIGS. 4A, 4B and 4C in order of (1) an operation of forming a refractive index distribution, (2) an operation of illuminating the photoreceptor body with light, and (3) an operation of relaxing the refractive index distribution.

Figure 4A:
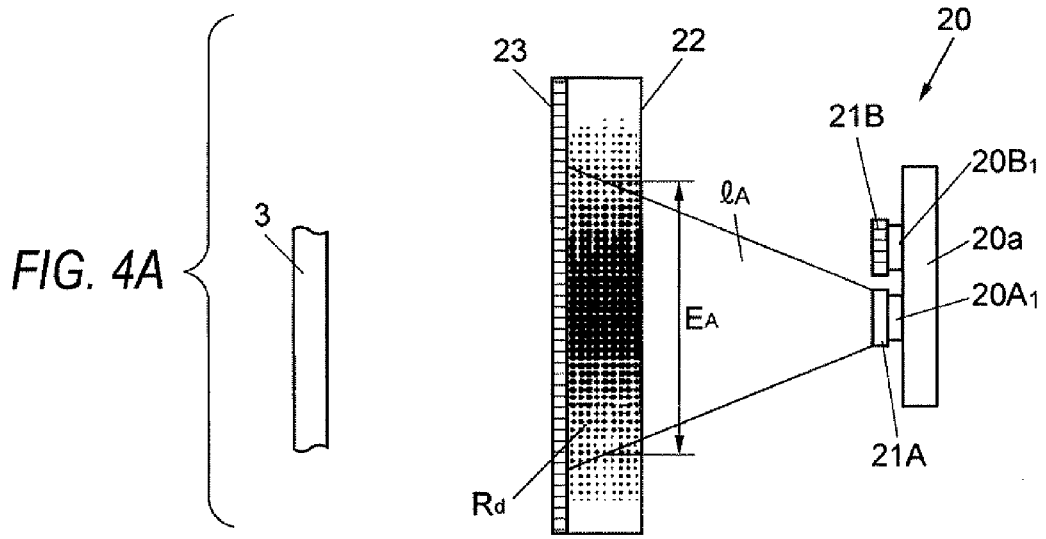
FIGS. 4A, 4B and 4C are side views showing example unit operations of the exposing device.
Figure 4B:
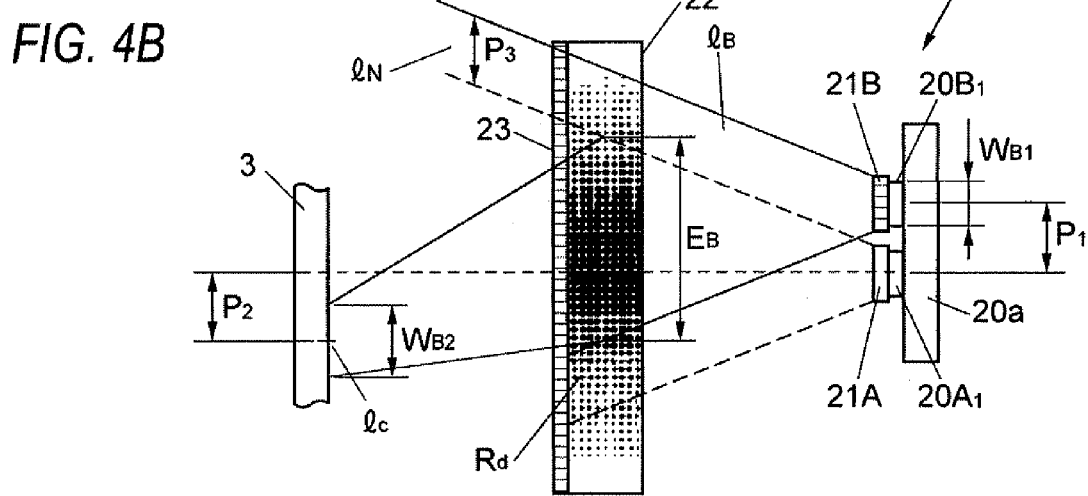
Figure 4C:
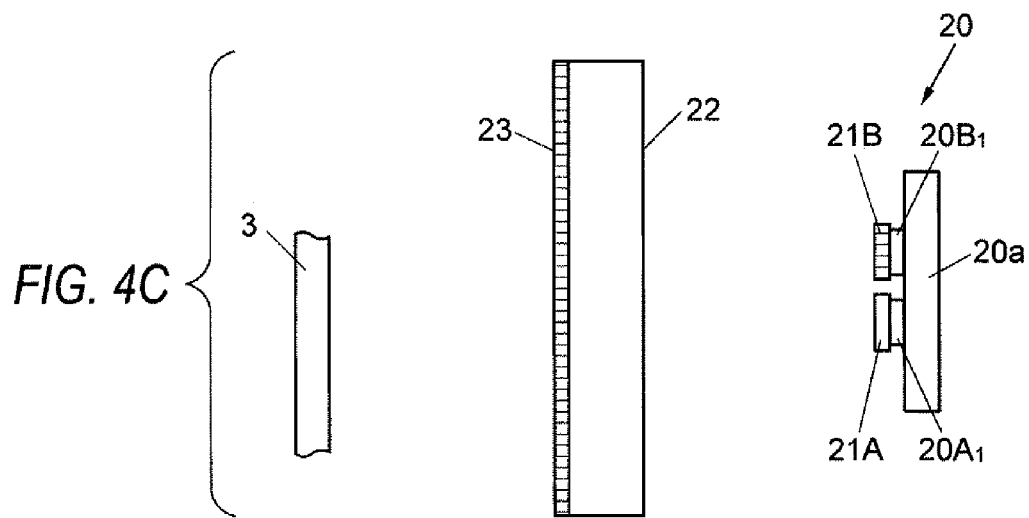

FIGS. 4A, 4B and 4C are side views showing example unit operations of the exposing device 1.

(1) Operation of Forming a Refractive Index Distribution

First, as shown in FIG. 4A, the control section 4 controls the first light source driving section 40A to cause the leftmost first light-emitting element $20A_1$ to emit light. Illumination light $l_A$ as polarized by the first polarizing plate 21A shines on the liquid crystal panel 22, whereby an orientation variation is caused in a region $E_A$ of the liquid crystal panel 22. A convex refractive index distribution $R_d$ is formed in the liquid crystal panel 22 for polarized light that is produced by passage, through the second polarizing plate 21B, of light emitted from the second light-emitting element $20B_1$. The illumination light $l_A$ does not reach the photoreceptor body 3 because it is stopped by the third polarizing plate 23 whose polarization direction is perpendicular to the polarization direction of the illumination light $l_A$.

Where the liquid crystal panel 22 employs azobenzene, bacteriorhodopsin, or the like, the response speed of an orientation variation caused by incident light is several nanoseconds to several hundreds of microseconds when, for example, the wavelength and the intensity of the incident light are set at 532 nm and several tens of milliwatts per square centimeters, respectively.

Figure 5:
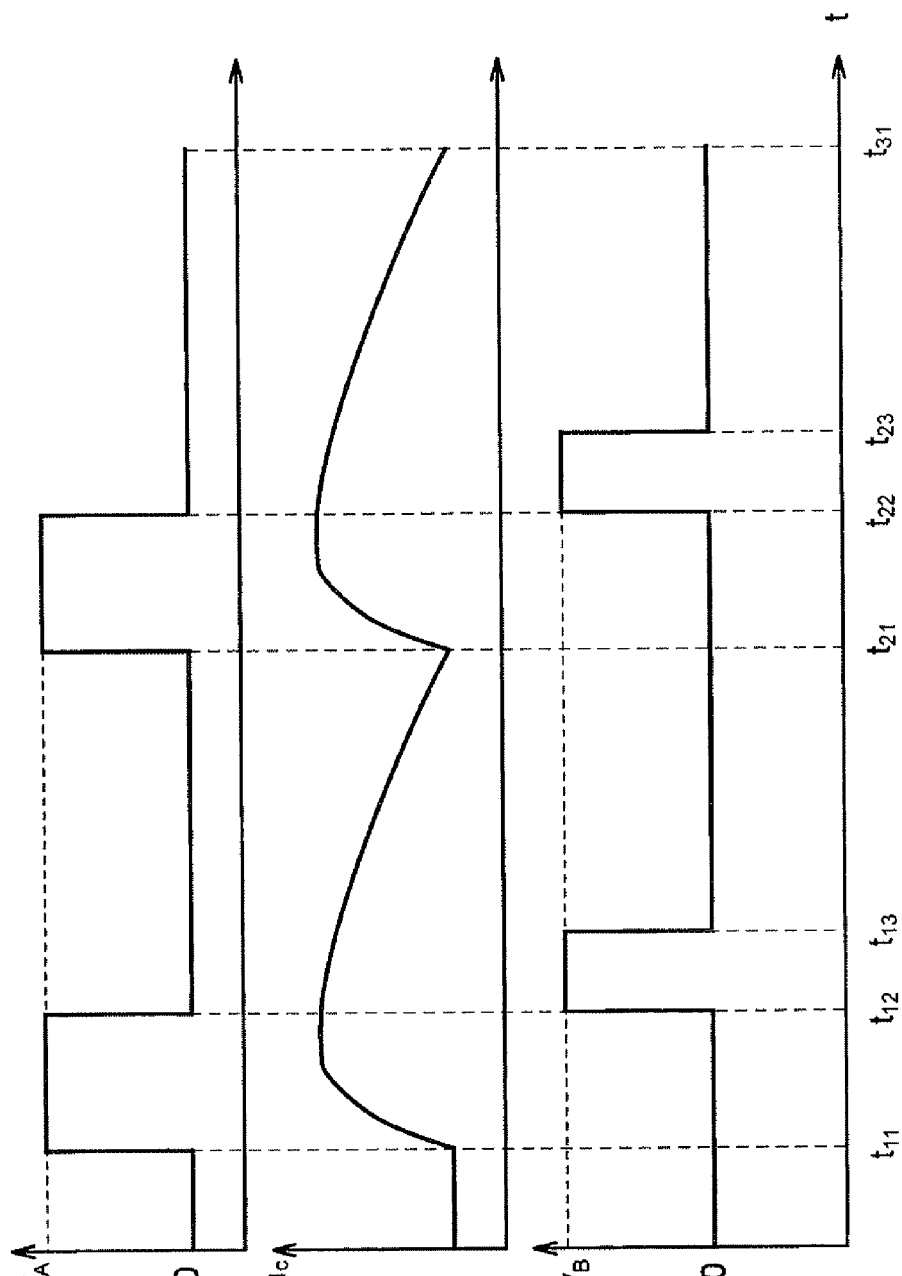
FIG. 5 is a timing chart of an example operation of the exposing device.
Figure 6:
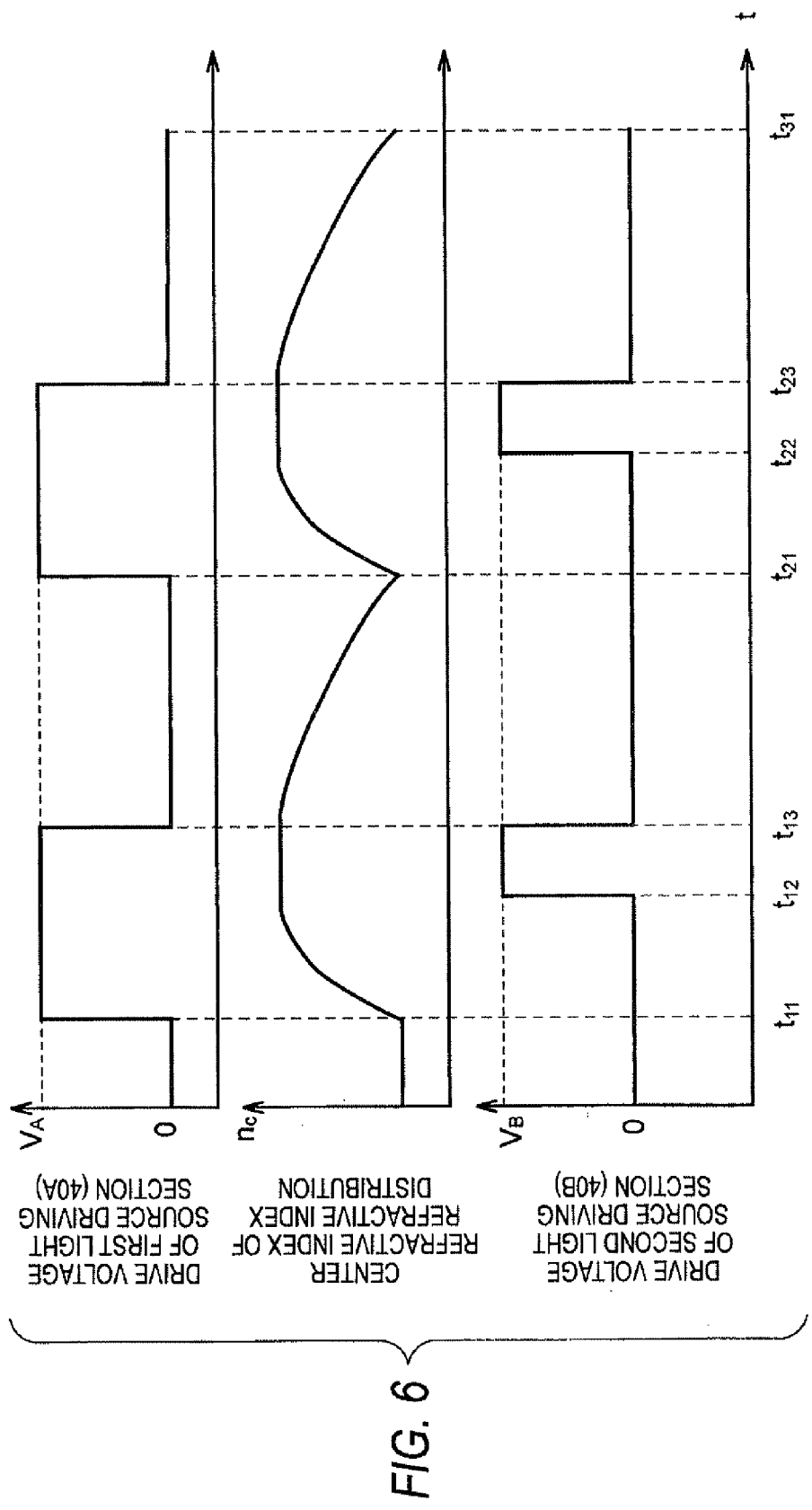
FIG. 6 is a timing chart of another example operation of the exposing device.

FIG. 5 is a timing chart of an example operation of the exposing device 1. FIG. 6 is a timing chart of another example operation of the exposing device 1.

As shown in FIG. 5, the control section 4 controls the drive voltage of the first light source driving section 40A to a predetermined voltage $V_A$ from time $t_{11}$ to $t_{12}$. As a result, the leftmost first light-emitting element $20A_1$ (see FIG. 1) emits light and illumination light $l_A$ shines on the liquid crystal panel 22, whereby a refractive index distribution $R_d$ having a center refractive index $n_c$ is formed.

(2) Operation of Illuminating the Photoreceptor Body with Light

Then, as shown in FIG. 4B, before completion of relaxation of the refractive index distribution $R_d$ that was formed by (1) the operation of forming a refractive index distribution, that is, before time $t_{21}$ (see FIG. 5), the control section 4 of the exposing device 1 controls the second light source driving section 40B to cause the second light-emitting element $20B_1$ which corresponds to the first light-emitting element $20A_1$ to emit light, whereby illumination light $l_B$ as polarized by the second polarizing plate 21B shines on the liquid crystal panel 22 from time $t_{12}$ to $t_{13}$, for example. Although in the example of FIG. 5 the driving by the second light source driving section 40B is started after the driving by the first light source driving section 40A is finished at time $t_{12}$, a time slot may exist in which both of the first light source driving section 40A and the second light source driving section 40B perform driving. For example, as shown in FIG. 6, the second light-emitting element $20B_1$ may start and finish light emission in a period when the first light-emitting element $20A_1$ emits light.

That portion of the illumination light $l_B$ which shines on a region $E_B$ that is included in the region $E_A$ is focused by the refractive index distribution $R_d$ on the photoreceptor body 3 as focused light $l_C$ and passes through the third polarizing plate 23 whose polarization direction is the same as the polarization direction of the illumination light $l_B$. The above-mentioned distances $d_1$ and $d_2$ and the refractive index distribution $R_d$ are adjusted so that the width $W_{B2}$ of a region on which the focused light $l_C$ shines becomes equal to the width $W_{B1}$. The region on which the focused light $l_C$ shines is offset from the center of the light emission surface of the first light-emitting element $20A_1$ by a distance $P_2$ which is equal to the interval $P_1$.

That portion of the illumination light $l_B$ which shines on a region having a width $P_3$ (=$P_1$) that is outside the region $E_A$ passes through the third polarizing plate 23 as noise light $l_N$. To reduce the noise light $l_N$, the exposing device 1 may be configured so that the illumination region of the illumination light $l_B$ is fully included in the region $E_A$.

Photoelectric conversion is caused on the photoreceptor body 3 by the focused light $l_C$, whereby an electrostatic latent image is formed by generated charges.

(3) Operation of Relaxing the Refractive Index Distribution

Then, as shown in FIG. 4C, the control section 4 controls the second light source driving section 40B to stop the light emission of the second light-emitting element $20B_1$ at time $t_{13}$ (see FIG. 5), and stands by until time $t_{21}$ when the refractive index distribution $R_d$ is relaxed completely. The control section 4 needs to stand by, that is, refrain from causing the second light-emitting element $20B_2$ to emit light which is adjacent to the second light-emitting element $20B_1$ and is to emit light next, at least while in the main scanning direction $D_1$ part of the preceding refractive index distribution $R_d$ remains in a region on which illumination light $l_B$ of the second light-emitting element $20B_2$ is to shine. The relaxation time of the refractive index distribution $R_d$ of the liquid crystal panel 22 is several tens of nanoseconds to several tens of microseconds.

Sets of unit operations (1)-(3) are performed in order as a scan proceeds in the main scanning direction $D_1$ for the respective pairs of a first light-emitting element 20A and a second light-emitting element 20B. More specifically, the first light-emitting element $20A_1$ and the second light-emitting element $20B_1$ emit light in time slots of the period from time $t_{11}$ to $t_{21}$ and the first light-emitting element $20A_2$ and the second light-emitting element $20B_2$ emit light in time slots of the period from time $t_{21}$ to $t_{31}$.

When an exposure in the main scanning direction $D_1$ has completed, sets of unit operations (1)-(3) are performed again in the main scanning direction $D_1$ after a one-line movement is made in the auxiliary scanning direction $D_2$. Such a one-line operation is performed repeatedly, whereby an electrostatic latent image is formed on the photoreceptor body 3. In each one-line exposure in the main scanning direction $D_1$, the pairs of a first light-emitting element 20A and a second light-emitting element 20B operate at intervals of several milliseconds.

Modifications

The invention is not limited to the above exemplary embodiment, and various modifications are possible without departing from the spirit and scope of the invention.

For example, where the second light-emitting elements 20B emit polarized light (e.g., linearly polarized laser light), the second polarizing plate 21B can be omitted. Even in this case, the second polarizing plate 21B may be used for eliminating noise that is caused by circularly polarized light or elliptically polarized light that is emitted from the second light-emitting elements 20B.

Although the above exemplary embodiment is directed to the scanning method in which the pairs of a first light-emitting element 20A and a second light-emitting element 20B operate in order in the main scanning direction $D_1$, the scanning method is not limited to it. Plural first light-emitting elements 20A or second light-emitting elements 20B may emit light simultaneously or in a predetermined pattern. It is preferable to shorten the scanning time by using a light emission pattern with which another refractive index distribution Rd is formed at such a position as to cause no influence before relaxation of one refractive index distribution Rd formed on the liquid crystal panel 22 is completed.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An exposing device comprising:
   a first light-emitting diode that emits first light;
   a first polarizing plate that polarizes the first light;
   a second light-emitting diode that emits second light;
   a second polarizing plate that polarizes the second light in a direction that is perpendicular to a polarization direction of the first polarizing plate; and
   a liquid crystal panel that is disposed between the first and second light-emitting diodes and a photoreceptor body to be exposed to the second light,
   the liquid crystal panel configured to act as a convex refractive lens due to an orientation variation that is caused by illumination with the first light, the liquid crystal panel being configured to focus the second light on the photoreceptor body via the convex refractive lens, and the liquid crystal panel being further configured to transmit polarized light having a polarization direction that is same as the polarization direction of the second polarizing plate.

2. The exposing device according to claim 1, wherein
   the first light has a first wavelength,
   the second light has a second wavelength that is different than the first wavelength, and
   the liquid crystal panel is light-responsive to light having the first wavelength.

3. The exposing device according to claim 1, wherein a direction in which the first light is emitted is the same as a direction in which the second light is emitted.

\* \* \* \* \*